US009641965B1

(12) United States Patent
Rapp et al.

(10) Patent No.: US 9,641,965 B1
(45) Date of Patent: May 2, 2017

(54) METHOD, SYSTEM AND COMPUTER PROGRAM PRODUCT FOR LAW ENFORCEMENT

(71) Applicant: COPsync, Inc., Dallas, TX (US)

(72) Inventors: Jason Shane Rapp, Canyon Lake, TX (US); Russell Dean Chaney, Canyon Lake, TX (US)

(73) Assignee: COPsync, Inc., Dallas, TX (US)

( * ) Notice: Subject to any disclaimer, the term of this patent is extended or adjusted under 35 U.S.C. 154(b) by 28 days.

(21) Appl. No.: 14/192,369

(22) Filed: Feb. 27, 2014

Related U.S. Application Data

(60) Provisional application No. 61/770,778, filed on Feb. 28, 2013.

(51) Int. Cl.
H04W 4/02 (2009.01)
(52) U.S. Cl.
CPC ..................................... H04W 4/02 (2013.01)
(58) Field of Classification Search
CPC ...................................................... H04W 4/02
USPC ............... 340/539.13, 539.2; 455/456.1–457
See application file for complete search history.

(56) References Cited

U.S. PATENT DOCUMENTS

| 7,969,297 | B2 * | 6/2011 | Haartsen | G01S 1/70 340/531 |
| 8,626,112 | B2 * | 1/2014 | Ray et al. | 455/404.1 |
| 8,630,820 | B2 * | 1/2014 | Amis | 702/186 |
| 2005/0239477 | A1 * | 10/2005 | Kim et al. | 455/456.1 |
| 2006/0142027 | A1 * | 6/2006 | Krishnamurthi | H04M 1/72572 455/457 |
| 2011/0130112 | A1 * | 6/2011 | Saigh | H04M 1/7253 455/404.1 |
| 2014/0344404 | A1 * | 11/2014 | Layson | 709/217 |
| 2014/0347492 | A1 * | 11/2014 | Fales | G01C 11/06 348/164 |

FOREIGN PATENT DOCUMENTS

WO      WO 0223381 A1 *  3/2002

* cited by examiner

Primary Examiner — Marisol Figueroa
(74) Attorney, Agent, or Firm — Fish & Richardson P.C.

(57) ABSTRACT

Methods, systems, and apparatus include computer programs encoded on a computer-readable storage medium, including a method for providing information. The method includes receiving a prompt from a user operator associated with a first unit. The method further includes determining a location associated with the first unit. The method further includes responsive to the prompt, determining one or more second mobile units within a geographic area associated with the location. The method further includes outputting a communication to the one or more second mobile units. The method further includes enabling a direct communication link between the user operator and an operator associated with a respective one of the one or more second mobile units. The method further includes providing environment information to the one or more second mobile units based at least in part on the prompt.

27 Claims, 11 Drawing Sheets

METHOD, SYSTEM AND COMPUTER PROGRAM PRODUCT FOR LAW ENFORCEMENT

CROSS-REFERENCE TO RELATED APPLICATIONS

This application claims priority to U.S. Provisional Application No. 61/770,778 filed on Feb. 28, 2013. The disclosure of the prior application is considered part of and is incorporated by reference in the disclosure of this application

BACKGROUND

This disclosure relates in general to information handling systems.

SUMMARY

In general, one innovative aspect of the subject matter described in this specification can be implemented in methods that include a computer-implemented method for providing information. The method includes receiving a prompt from a user operator associated with a first unit. The method further includes determining a location associated with the first unit. Responsive to the prompt, one or more second mobile units within a geographic area associated with the location are determined. The method further includes outputting a communication to the one or more second mobile units and enabling a direct communication link between the user operator and an operator associated with a respective one or more second mobile units. The method further includes providing environment information to the one or more second mobile units based at least in part on the prompt.

These and other implementations can each optionally include one or more of the following features. The environment information can include a location of interest at a facility associated with the first unit. The environment information can include a layout of a facility associated with the first unit. The location of interest can be provided as part of the prompt. The method can further include providing the user operator with layout information associated with the location and receiving from the user an indication of a point of interest based on the layout information wherein the environment information includes the point of interest. The environment information can include the layout information with the point of interest information. The method can further include retrieving layout information associated with a facility at the location. The environment information can include a layout of a facility associated with the location. The prompt can include classification information, and eligible second mobile units are identified based at least in part on the classification information.

The classification information can classify a type of alert being raised by the user operator. Determining a location can include accessing a record that includes the location information. Determining the location can include receiving the location information along with the prompt. Outputting a communication can include outputting at least a portion of the prompt. The one or more second mobile units can be associated with emergency service units. Enabling a direct communication link can include opening a chat room for facilitating direct communications between the user operator and users associated with the one or more second mobile units. The first unit can be a mobile device. The first unit can be a mobile telephone, tablet or laptop computer. The method can further include providing an application on a mobile device for enabling the operator user to initiate the prompt. The prompt can be for a check to verify a background associated with a person or a vehicle, determining when an alert should be raised based on a check of the background of the person or vehicle, and providing a signal back to the first unit based on the alert.

In general, another innovative aspect of the subject matter described in this specification can be implemented in methods that include another computer-implemented method for providing information. The method includes receiving a prompt from a user operator associated with a first unit, the prompt being for a check to verify a background associated with a person or vehicle. The method further includes performing the check and determining when an alert should be raised based on results of the check of the background of the person or vehicle. The method further includes providing a signal back to the first unit based on the alert. The method further includes determining a location associated with the first unit and determining one or more second mobile units within a geographic area associated with the location. The method further includes outputting a communication to the one or more second mobile units based on the alert.

These and other implementations can each optionally include one or more of the following features. The method can further include enabling a direct communication link between the user operator and an operator associated with a respective one of one or more second mobile units. The method can further include providing environment information to the one or more second mobile units based at least in part on the prompt. The environment information can include a location of interest at a facility associated with the first unit. The environment information can include a layout of a facility associated with the first unit. The location of interest can be provided as part of the prompt. The method can further include providing the user operator with layout information associated with the location and receiving from the user an indication of a point of interest based on the layout information, wherein the environment information includes the point of interest. The first unit can be a mobile device.

The details of one or more implementations of the subject matter described in this specification are set forth in the accompanying drawings and the description below. Other features, aspects, and advantages of the subject matter will become apparent from the description, the drawings, and the claims.

DESCRIPTION

Figure 1:
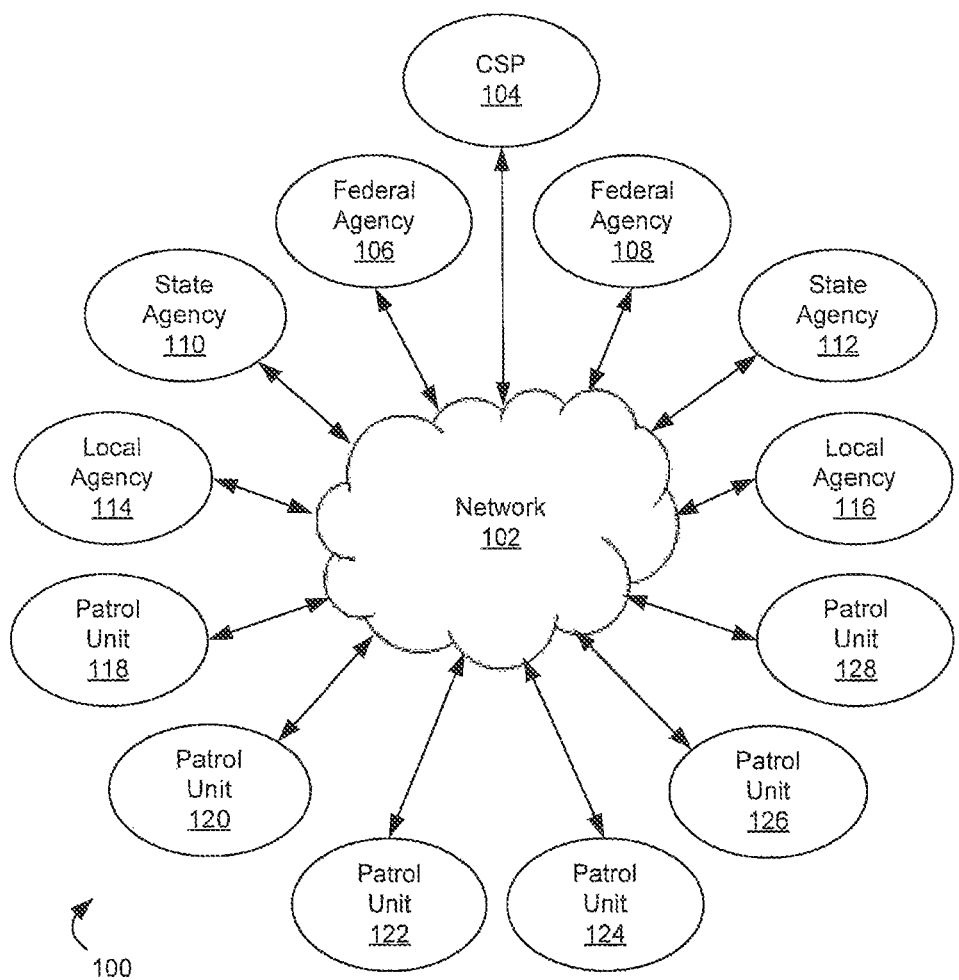
FIG. 1 is a block diagram of an information handling system of the illustrative embodiment.

FIG. 1 is a block diagram of a system, indicated generally at 100, according to the illustrative embodiment. The system 100 includes: (a) a network 102, such as a Transport Control Protocol/Internet Protocol ("TCP/IP") network (e.g., the Internet or an intranet); (b) a crime-fighting services platform 104 ("CSP") for executing a CSP process; (c) federal agencies 106 and 108, each for executing respective federal agency processes; (d) state agencies 110 and 112, each for executing respective state agency processes; (e) local agencies 114 and 116, each for executing respective local agency processes; and (f) mobile patrol units 118, 120, 122, 124, 126 and 128 (e.g., located in respective patrol cars), each for executing respective patrol unit processes.

In one embodiment: (a) the agencies 106, 108, 110, 112, 114 and 116 are law enforcement agencies; and (b) the CSP aggregates, manages and communicates various information from and to the agencies and patrol units in support of their law enforcement activities. Accordingly, as shown in FIG. 1, the CSP is coupled through the network 102 to each of the agencies and patrol units. Through the network 102, information is electronically (e.g., wirelessly) communicated by the CSP, agencies and patrol units, to and from one another. For example, through the network 102, human users (from among the CSP, agencies and patrol units) may elect to communicate such information to and from one another orally (e.g., voice-over-IP communications).

For clarity, FIG. 1 shows one representative CSP, but more such CSPs are likewise connectable to the network 102. Also, FIG. 1 shows six representative agencies, but more such agencies are likewise connectable to the network 102 for operation with the CSP. Further, FIG. 1 shows six representative patrol units, but more such patrol units are likewise connectable (e.g., via wireless telecommunication) to the network 102 for operation with the CSP.

The CSP is helpful for accurately and efficiently aggregating, managing and communicating various information from and to the agencies and patrol units in support of their law enforcement activities, especially in view of: (a) the potentially large number of such agencies and patrol units; (b) their even larger number of various activities, and potential difficulty in timely obtaining and sharing relevant information about such activities, which are potentially complex; (c) a wide range of different circumstances and preferences of such agencies and patrol units; and (d) potentially frequent changes in such agencies, patrol units, activities, circumstances and preferences.

Figure 2:
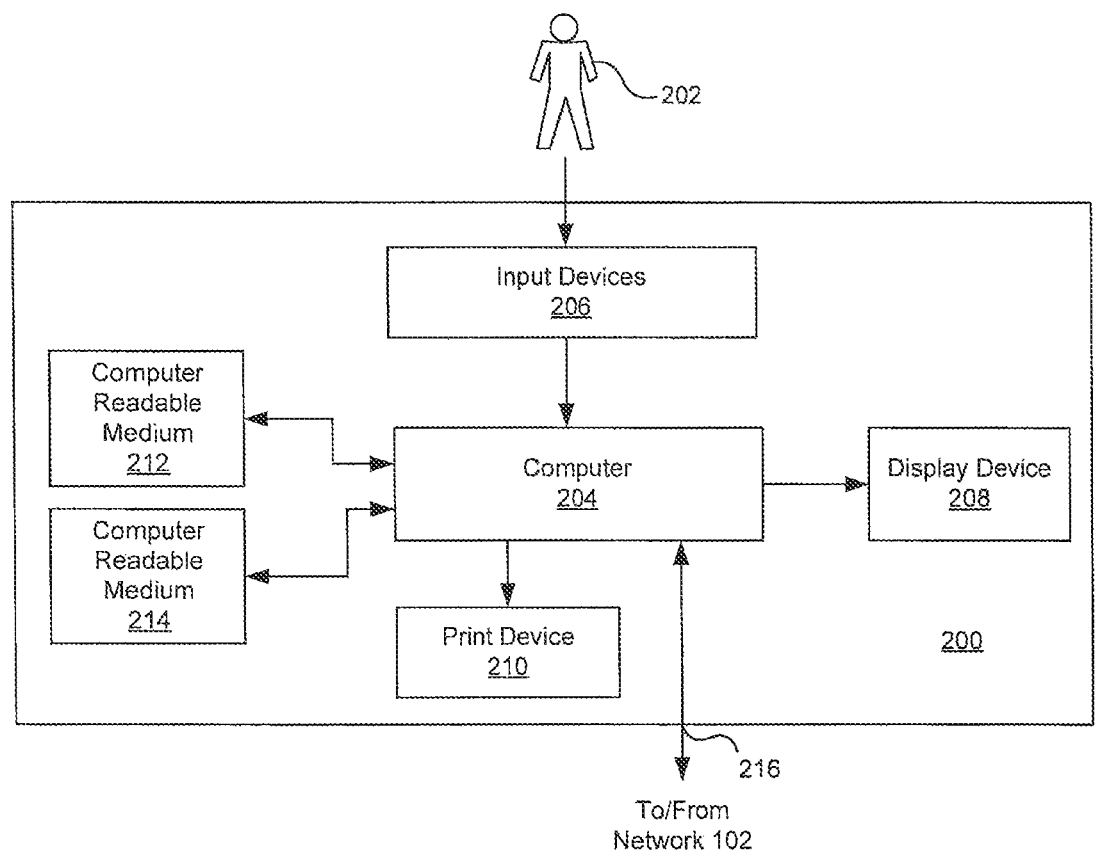
FIG. 2 is a block diagram of a representative computing system of the information handling system of FIG. 1.

FIG. 2 is a block diagram of a representative computing system 200 of the illustrative embodiment. Each of the CSP, agencies and patrol units includes a respective computing system, such as the representative computing system 200, for executing a respective process and performing respective operations (e.g., processing and communicating information) in response thereto. Such computing system operates in association with a respective human user 202.

The system 200 is formed by various electronic circuitry components, including: (a) a general purpose computer 204, which is a general purpose computational resource such as a laptop computer, for executing and otherwise processing instructions, and for performing additional operations (e.g., communicating information) in response thereto; (b) input devices 206 for receiving information from the user 202; (c) a display device 208 (e.g., a conventional flat panel monitor) for displaying information to the user 202; (d) a print device 210 (e.g., a conventional electronic printer) for printing visual images on paper; (e) a computer readable medium (or apparatus) 212 (e.g., a hard disk drive or other nonvolatile storage device) for storing information; (f) a portable computer readable medium (or apparatus) 214 (e.g., a removable flash memory card or CD-ROM) for storing information; and (g) various other electronic circuitry for performing other operations of the system 200.

For example, the computer 204 includes: (a) a network interface (e.g., circuitry) for communicating information with the network 102 (e.g., outputting information to, and receiving information from, the network 102), such as by transferring information (e.g., instructions, data, signals) between the computer 204 and the network 102; and (b) a memory device (e.g., random access memory ("RAM") device and/or read only memory ("ROM") device) for storing information (e.g., instructions of software executed by the computer 204, and data processed by the computer 204 in response to such instructions). Accordingly, the network interface of the computer 204 is coupled through a network connection 216 to the network 102. Also, in the example of FIG. 2, the computer 204 is connected to the input devices 206, the display device 208, the print device 210, the computer readable medium 212, and the computer readable medium 214, as shown in FIG. 2. The computer 204 executes: (a) operating system software for performing general purpose tasks; and (b) other processes and applications.

In response to signals from the computer 204, the display device 208 displays visual images, which represent information, and the user 202 views such visual images. Also, the user 202 operates the input devices 206 for outputting information to the computer 204, and the computer 204 receives such information from the input devices 206. Moreover, in response to signals from the computer 204, the print device 210 prints visual images on paper, and the user 202 views such visual images.

The input devices 206 include, for example, a conventional electronic keyboard (or keypad) and a pointing device, such as a conventional electronic "mouse" or rollerball. The user 202 operates the keyboard (or keypad) to output alphanumeric text information to the computer 204, which receives such alphanumeric text information. The user 202 operates the pointing device to output cursor-control information to the computer 204, and the computer 204 receives such cursor-control information. The input devices 206 also include, for example, touch-sensitive circuitry of a liquid crystal display ("LCD") device.

Figure 3:
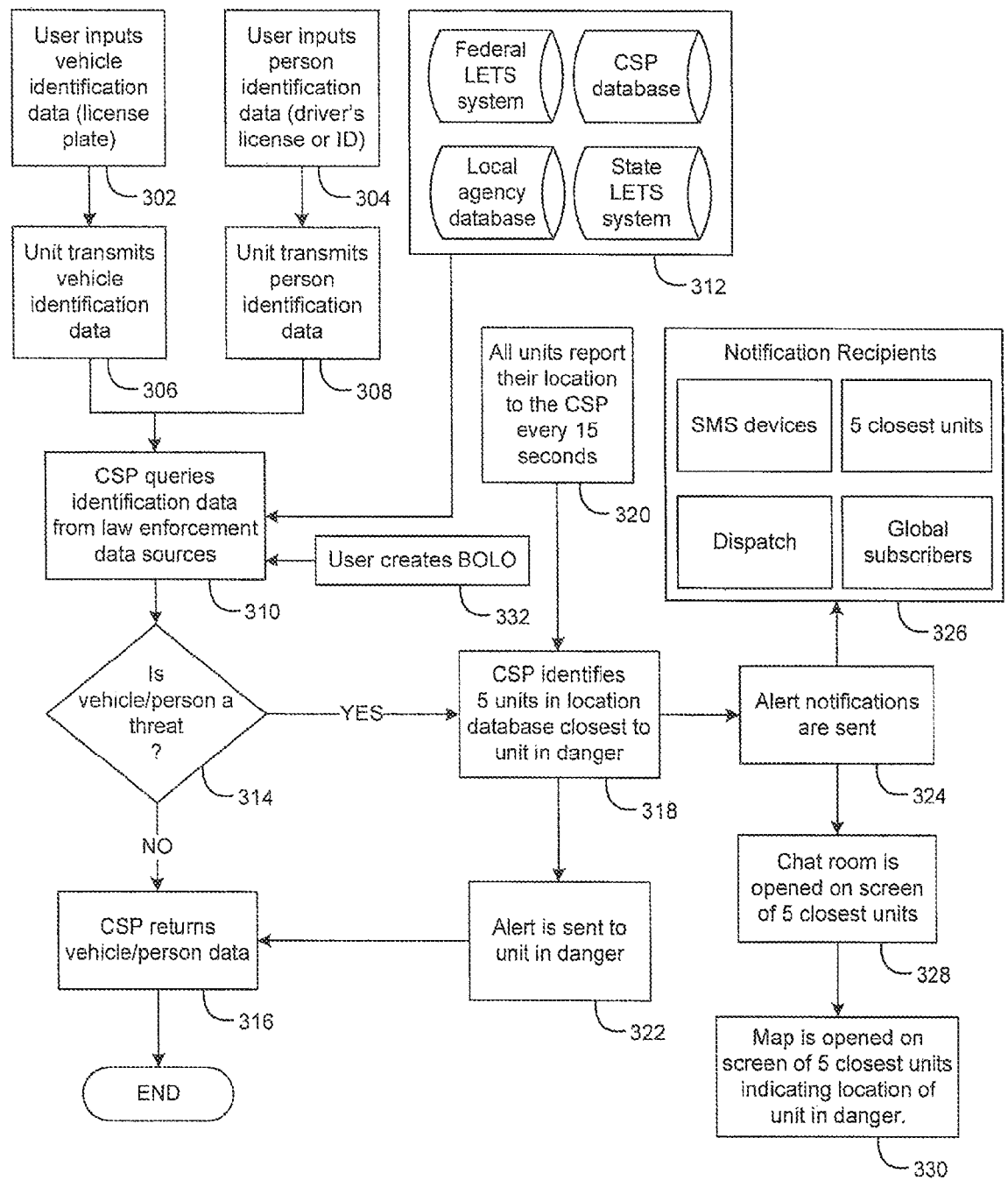
FIG. 3 is a flowchart of a first operation of the information handling system of FIG. 1.

FIG. 3 is a flowchart of a first operation of the system 100. From an officer (which is associated with a patrol unit) via the patrol unit's associated input devices (e.g., from a human officer, such as a police officer, a sheriff or a security person), the patrol unit receives information for identifying a subject ("subject identification data"), such as: vehicle identification data (step 302) for identifying a subject vehicle; and person identification data (step 304) for identifying a subject person. In response to the patrol unit's receipt of the subject identification data, the patrol unit automatically outputs such data to the CSP (steps 306 and 308) through the network 102. At a step 310, in response to such data, the CSP automatically: (a) receives and stores such data in association with such patrol unit's reported then-current geographic location; and (b) through the network 102 (e.g., via extensible markup language ("XML") transmission), queries multiple law enforcement sources 312 about the subject, and receives (from the sources 312) information about the subject in response thereto. The sources 312 include: (a) local agency databases; (b) the CSP's database; (c) state law enforcement telecommunications system ("LETS") databases; and (d) federal LETS databases.

At a step 314, in response to the information (received by the CSP from the sources 312) about the subject (e.g., about such vehicle and/or person), the CSP executes a software application for: (a) analyzing such information; and (b) in response to such analysis, determining whether the subject is a likely threat (e.g., a probable danger to the patrol unit, its associated patrol car, and/or its associated officer). If the CSP determines (at the step 314) that the subject is an unlikely threat, then the CSP outputs (through the network 102) a message to inform the patrol unit accordingly (step 316). Such message includes information (received by the CSP from the sources 312) about the subject.

Conversely, if the CSP determines (at the step 314) that the subject is a likely threat, then the CSP executes a software application for identifying a predetermined number (e.g., 5) of other patrol units that are most geographically proximate to the patrol unit in probable danger (step 318). As shown at a step 320, through the network 102, the patrol units report their respective then-current geographic locations to the CSP at a periodic rate (e.g., once every 15 seconds), so that such reports are periodically updated. The CSP automatically receives such reports through the network 102, and the CSP accordingly updates its record of such locations in a database of auto vehicle location ("AVL") information (e.g., stored in the computer readable medium 212 of the CSP), so that the CSP: (a) stores a timeline record of each patrol unit's various geographic locations; and (b) is thereby enabled to identify a predetermined number of other patrol units that are most geographically proximate to the patrol unit in probable danger.

After the step 318, the CSP outputs (through the network 102): (a) an alert to the patrol unit in probable danger (step 322), plus a message (to such patrol unit) that includes information (received by the CSP from the sources 312) about the subject and the likely threat (step 316); and (b) alert notifications (step 324) to other recipients 326 about the subject and the likely threat. The other recipients 326 include: (a) various global subscribers; (b) various dispatch units; (c) various short message service ("SMS") devices; and (d) additionally, only those identified predetermined number of other patrol units that are most geographically proximate to the patrol unit in probable danger. Accordingly, the CSP outputs the alert notifications to the other recipients 326 by one or more of the following techniques: (a) instant text messaging; (b) broadcast messaging; and (c) "officer needs assistance" messages.

Figure 6:
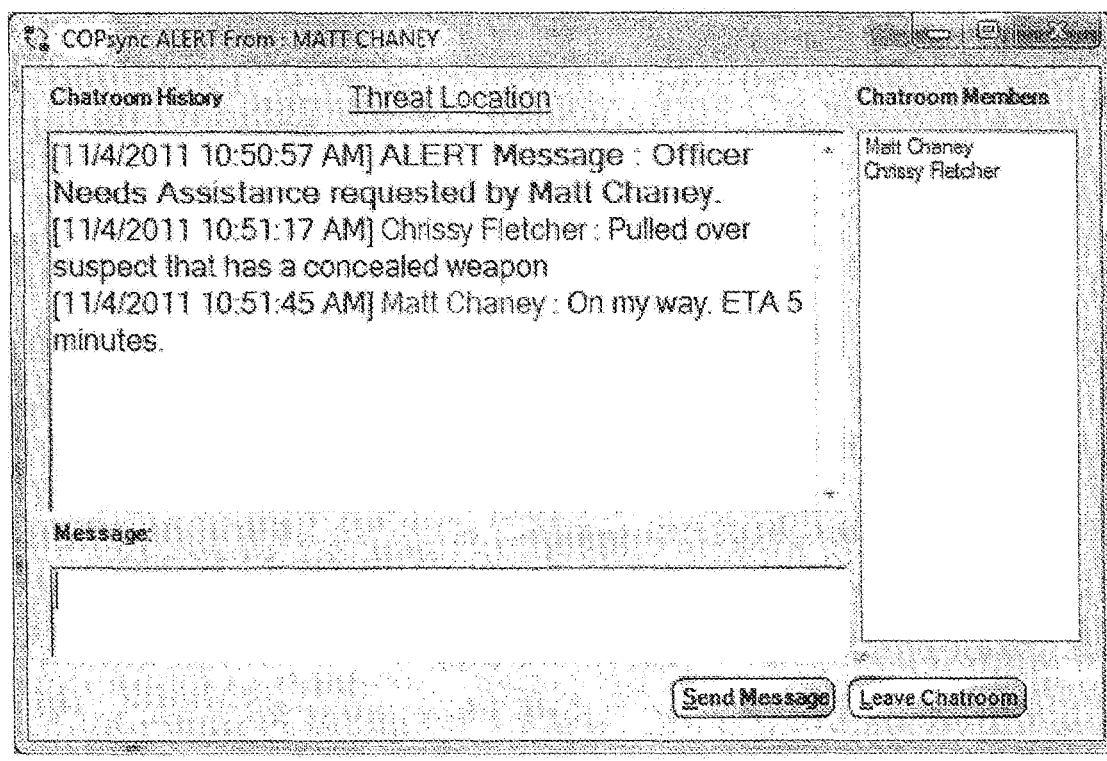
FIG. 6 is an illustration of a first screen displayed by a display device of the information handling system of FIG. 1.
Figure 7:
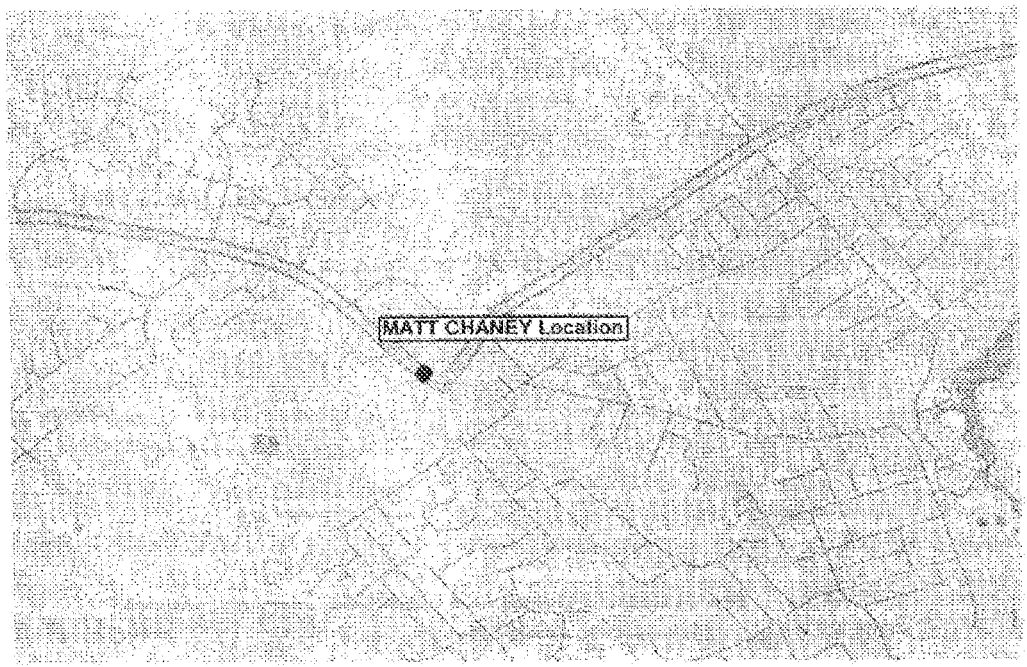
FIG. 7 is an illustration of a second screen displayed by a display device of the information handling system of FIG. 1.

In response to those other patrol units' receipt of the alert notifications from the CSP, they output (through their respectively associated display devices) suitable information to their respectively associated officers, who may respond accordingly (e.g., by assisting the officer of the patrol unit in probable danger). For example, such information includes display of: (a) a chat room screen (e.g., as shown in FIG. 6) for such officers to communicate (by alphanumeric text messages) with one another about the probable danger and possible responses (step 328); and (b) a map screen (e.g., as shown in FIG. 7) for showing the then-current geographic location of the patrol unit in probable danger, on a periodically updated basis (step 330).

At a step 332, in response to the patrol unit's receipt of a "be on the lookout" command ("BOLO") from an officer via the patrol unit's associated input devices, the patrol unit automatically outputs a BOLO message to the CSP through the network 102. At the step 310, in response to the BOLO message (which includes relevant subject identification data, such as vehicle identification data and/or person identification data), the CSP automatically: (a) receives and stores such data in association with such patrol unit's reported then-current geographic location; and (b) through the network 102, queries the sources 312 about the subject, and receives (from the sources 312) information about the subject in response thereto. After the step 310, the operation continues as discussed hereinabove in connection with the steps 314 through 330. In one example, in response to the BOLO message: (a) at the step 318, the CSP executes a software application for identifying all other patrol units that belong to a specified one or more categories of patrol units (e.g., all other patrol units that belong to a specified one or more task forces, sectors, agencies, counties, states and/or other governments); and (b) at the step 324, the CSP outputs (through the network 102) alert notifications to those other patrol units, in addition to the other recipients 326. In one embodiment, the one or more categories are specified in the BOLO message itself.

Figure 4:
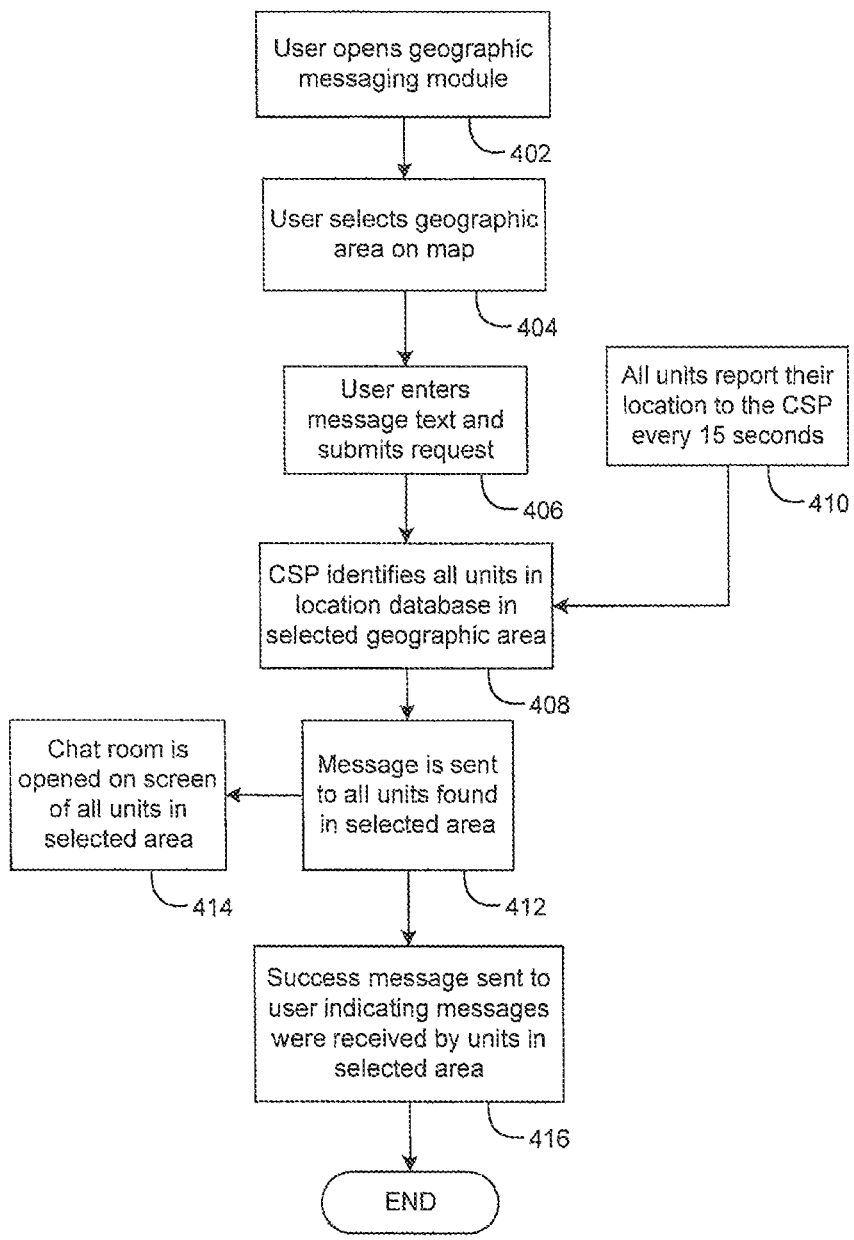
FIG. 4 is a flowchart of a second operation of the information handling system of FIG. 1.
Figure 8:
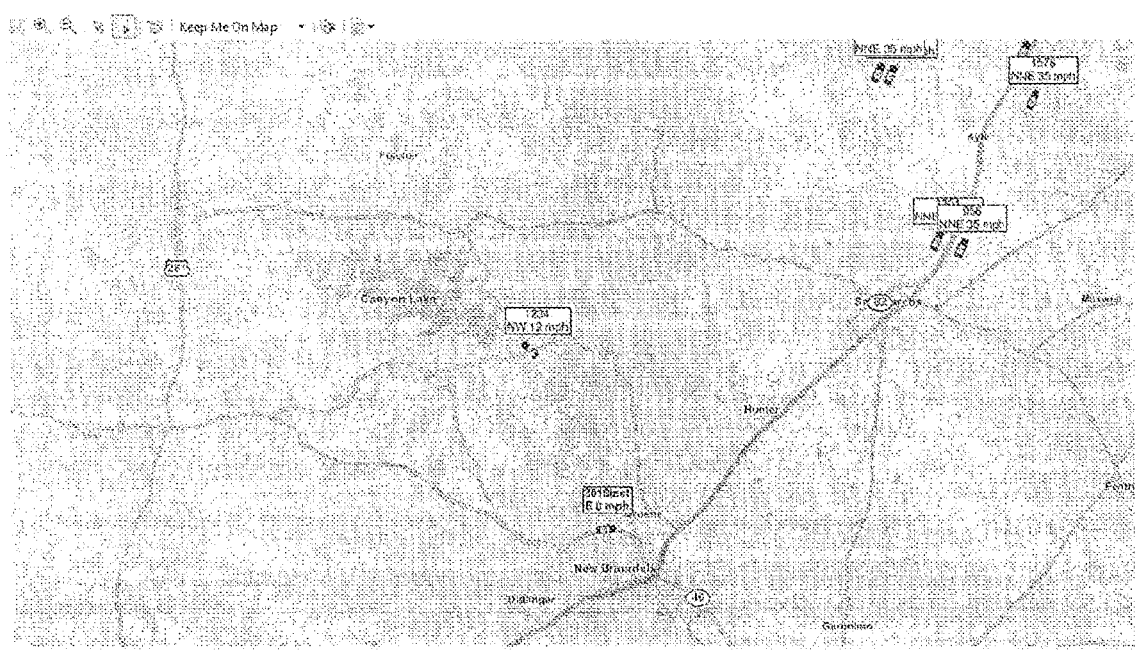
FIG. 8 is an illustration of a third screen displayed by a display device of the information handling system of FIG. 1.
Figure 9:
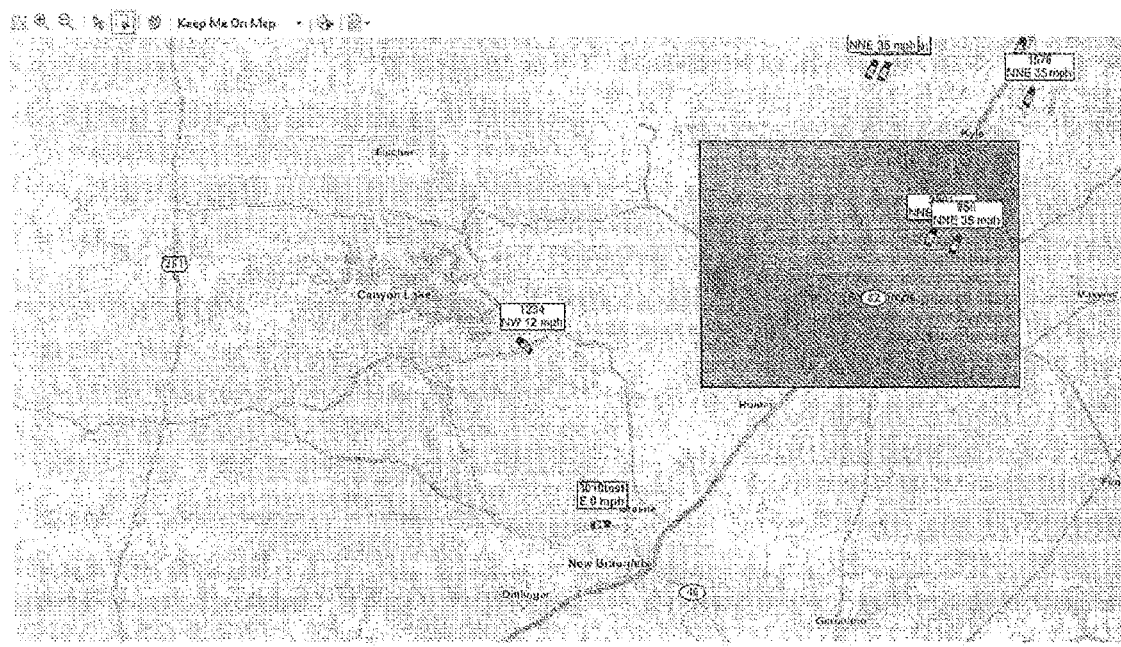
FIG. 9 is an illustration of a fourth screen displayed by a display device of the information handling system of FIG. 1.

FIG. 4 is a flowchart of a second operation of the system 100. At a step 402, in response to a patrol unit's receipt of a "geographic messaging" command from an officer via the patrol unit's associated input devices, the patrol unit automatically outputs (through its associated display device) an interactive map (e.g., as shown in FIG. 8) for display to the officer, so that the officer is enabled to specify a geographic area on the interactive map (e.g., by suitably operating a touch-screen display device, or by suitably operating the patrol unit's associated input devices). For example, the officer is enabled to specify the geographic area (step 404) as either: (a) an area within a geographic proximity (e.g., within a 5-mile geographic radius) of the patrol unit's then-current geographic location; or (b) any other area (e.g., even an irregularly shaped area), irrespective of whether the patrol unit is then-currently located within such area (e.g., as shown in FIG. 9.

At a step 406, from the patrol unit's associated input devices and/or display device, the patrol unit: (a) receives the officer's specified geographic area and the officer's specified communication (e.g., alphanumeric text); and (b) in response thereto, automatically outputs such information (e.g., the officer's specified geographic area and the officer's specified communication) within a "geographic communication" message to the CSP. At a step 408, in response to the "geographic communication" message, the CSP automatically: (a) receives and stores a record of the "geographic communication" message in association with such patrol unit's reported then-current geographic location; and (b) executes a software application for identifying all other patrol units that are then-currently located within the officer's specified geographic area (e.g., by analyzing the AVL information). As shown at a step 410, through the network 102, the patrol units report their respective then-current geographic locations to the CSP at a periodic rate (e.g., once every 15 seconds), as discussed hereinabove in connection with the step 320 (FIG. 3).

After the step 408, the CSP outputs (through the network 102) the officer's specified communication to only those other patrol units identified at the step 408. In response to those other patrol units' receipt of the officer's specified communication from the CSP, they output (through their respectively associated display devices) suitable information to their respectively associated officers, who may respond accordingly. For example, such information includes display of: (a) the officer's specified communication (step 412); and (b) a chat room screen (e.g., as shown in FIG. 6) for such officers to communicate (by alphanumeric text messages) with one another about possible responses (step 414). At a step 416, in response to those other patrol units' receipt of the officer's specified communication from the CSP, the CSP outputs (through the network 102) a success message for indicating such fact to the officer who issued the "geographic messaging" command.

Figure 5:
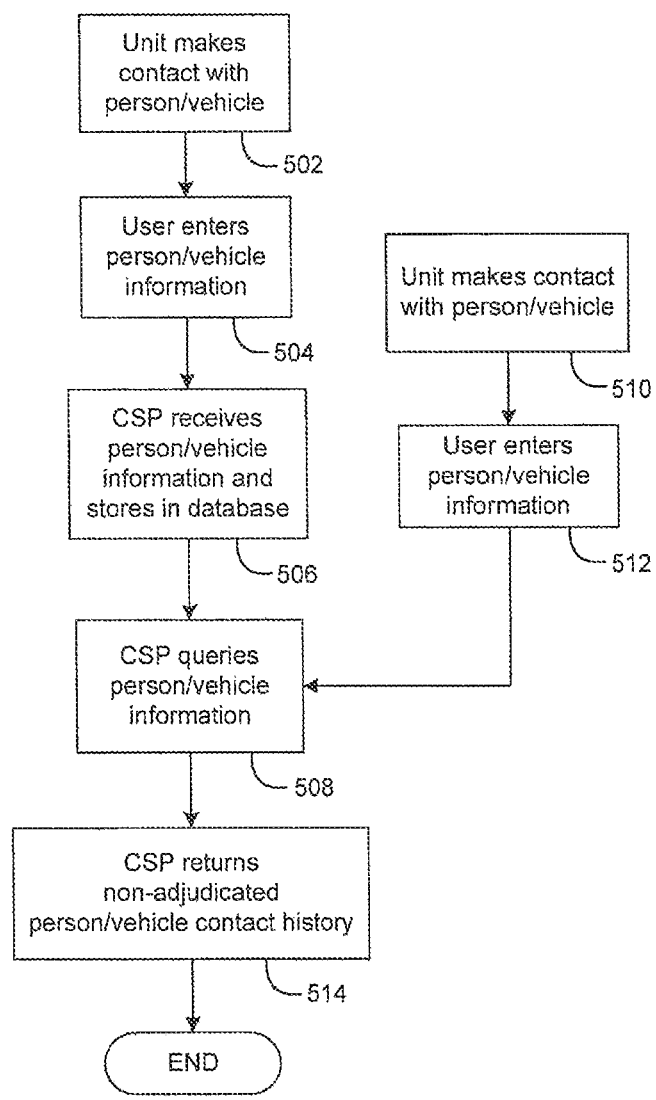
FIG. 5 is a flowchart of a third operation of the information handling system of FIG. 1.

FIG. 5 is a flowchart of a third operation of the system 100. At steps 502 and 504, in response to a patrol unit's receipt of a "contact history" record from an officer via the patrol unit's associated input devices, the patrol unit automatically outputs a "contact" message and such record to the CSP through the network 102. For example, the patrol unit receives the "contact history" record from the officer via the patrol unit's associated input devices, in response to the officer's: (a) communication with a person (e.g., pedestrian, occupant of a building, passenger of a motor vehicle, and/or operator of a motor vehicle); (b) visit to a location (e.g., physical address); and/or (c) encounter with an object (e.g., weapon, drugs, contraband, motor vehicle, and/or other property). At a step 506, in response to the "contact" message (which includes relevant subject identification data, such as vehicle identification data and/or person identification data), the CSP automatically receives and stores such record in the CSP's database (e.g., stored in the computer readable medium 212 of the CSP), irrespective of whether such record has been adjudicated (e.g., adjudicated by a court of law).

At a step 508, in response to the CSP's receipt (e.g., through the network 102) of a suitable query command from a human user (e.g., from among the CSP, agencies and patrol units), the CSP searches and analyzes its various databases of information (e.g., the sources 312 of FIG. 3) to identify relevant ones of such records. In one example, the suitable query command includes relevant subject identification data, such as vehicle identification data and/or person identification data (steps 510 and 512). After the step 508: (a) the CSP outputs (e.g., through the network 102) such identified records to the querying user at a step 514; and (b) from the CSP, the querying user receives and views such identified records for analysis.

The suitable query command includes hard and/or soft identifiers. For example: (a) hard identifiers identify a group of such records by specifying a particular person, location or object; and (b) soft identifiers identify a group of such records by specifying other types of attributes. The CSP automatically stores such records that it receives from all patrol units within the system 100, irrespective of whether such patrol units belong to a particular agency. On a substantially real-time basis after such receipt and storage by the CSP, and subsequently, the CSP makes such records available for such query by any agency or patrol unit within the system 100, irrespective of whether such records originated from patrol units that belong to a different agency within the system 100.

In yet another operation of the system 100, in response to a patrol unit's receipt of a "pursuit mode" command from an officer via the patrol unit's associated input devices, the patrol unit ("patrol unit in pursuit") automatically: (a) outputs a "pursuit" message to the CSP through the network 102; and (b) reports its then-current geographic location to the CSP at a higher rate (e.g., once every second instead of once every 15 seconds), until either a predetermined amount of time expires or the patrol unit receives an "end pursuit mode" command from the officer via the patrol unit's associated input devices. In response to the "pursuit" message, the CSP automatically receives and stores a record of the "pursuit" message in association with such patrol unit's reported then-current geographic location. Such record is stored in the CSP's database (e.g., stored in the computer readable medium 212 of the CSP).

In response to the CSP's receipt (e.g., through the network 102) of a suitable query command from a human user (e.g., from among the CSP, agencies and patrol units): (a) the CSP outputs (e.g., through the network 102) such "pursuit" record to the querying user; and (b) from the CSP, the querying user receives and views such "pursuit" record for analysis. The suitable query command includes hard and/or soft identifiers. On a substantially real-time basis after such receipt and storage by the CSP, and subsequently, the CSP makes such "pursuit" record available for such query by any agency or patrol unit within the system 100, irrespective of whether such "pursuit" record originated from a patrol unit that belongs to a different agency within the system 100.

In one example, the patrol unit receives the "pursuit mode" command from the officer via the patrol unit's associated input devices, in response to the officer's then-current encounter with a location of interest. For example, if the officer is driving a patrol car in pursuit of a suspect and then-currently views an object being thrown from the suspect's moving vehicle at a particular geographic location, then such particular geographic location becomes a location of interest. If the patrol unit timely receives the "pursuit mode" command from the officer via the patrol unit's associated input devices, in response to the officer's then-current encounter with such location of interest, then the CSP (in response to the "pursuit" message from the patrol unit) automatically receives and stores a record of the "pursuit" message in association with such patrol unit's reported then-current geographic location. On a substantially real-time basis after such receipt and storage by the CSP, and subsequently, the CSP makes such "pursuit" record available for query by any agency or patrol unit within the system 100, so that such location of interest is more readily identifiable.

Figure 10:
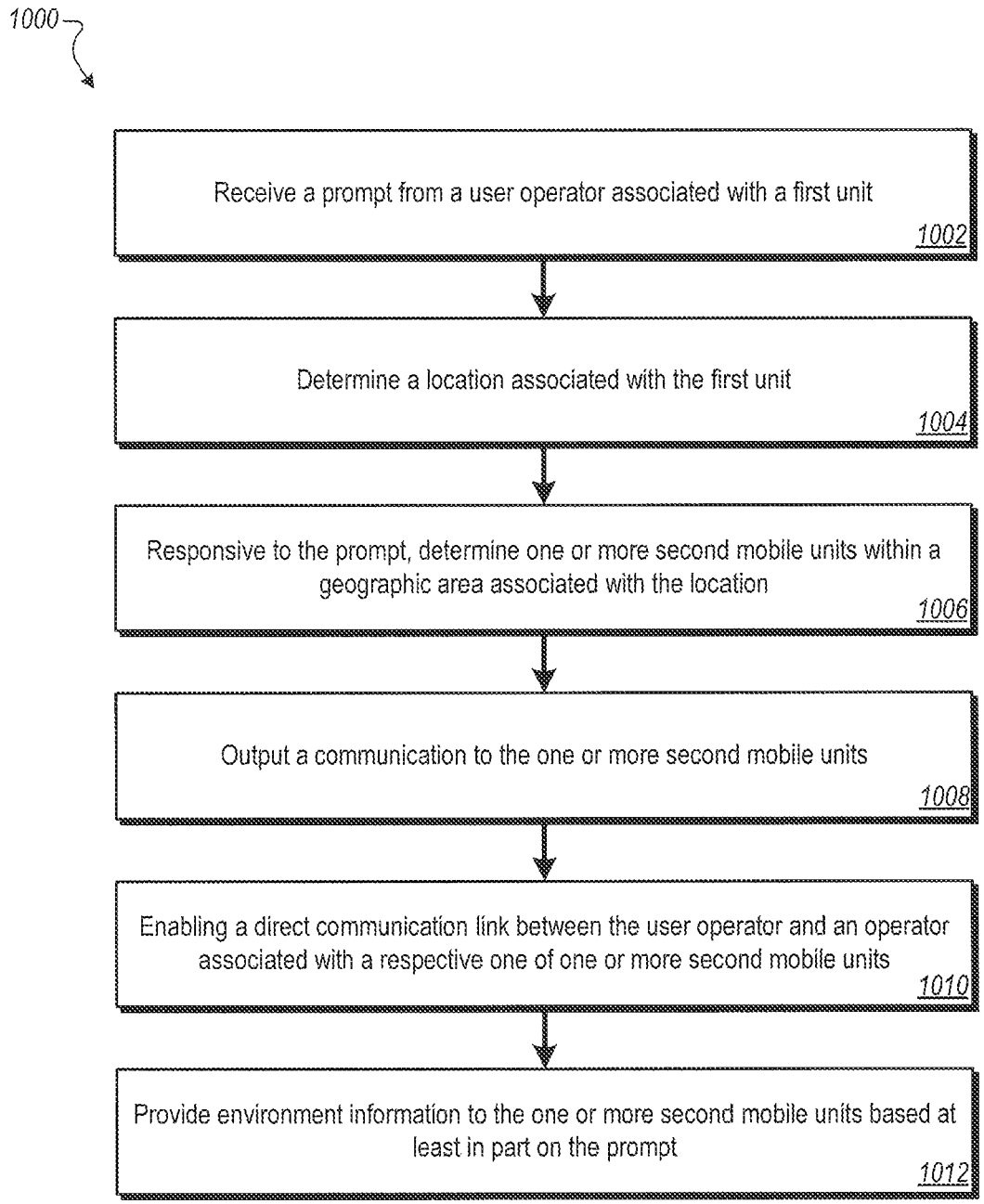
FIG. 10 is a flowchart of an example process for enabling a direct communication link between operators of two devices.

FIG. 10 is a flowchart of an example process 1000 for enabling a direct communication link between operators of two devices. In some implementations, the crime-fighting services platform 104 and/or other elements of the system 100 can perform steps of the process 1000 using instructions that are executed by one or more processors. For example, the process 1000 can enable school personnel to instantaneously communicate with local law enforcement patrol vehicles and agencies and summon assistance from the nearest law enforcement patrol officers. School personnel can also provide accurate real-time information to the closest patrol vehicles as to the nature of the threat or criminal activity. FIGS. 1-9 are used to provide example structures for performing the steps of the process 1000.

A prompt is received from a user operator associated with a first unit (1002). For example, the crime-fighting services platform 104 can receive a prompt indicating an alert condition from school personnel operating the first unit in the office of a school. The first unit can be a mobile device, a mobile telephone, a tablet, a laptop computer or some other computing device, such as a computer device in a school office.

In some implementations, an application can be provided on a mobile device for enabling the operator user to initiate the prompt. For example, school officials can initiate the prompt using a mobile device upon which is installed an application that interfaces with the crime-fighting services platform 104 and is configured do initiate a prompt based on inputs received from the school officials.

In some implementations, the prompt can be for a check to verify a background associated with a person or a vehicle. A determination can be made when an alert should be raised based on a check of the background of the person or vehicle. The system, crime-fighting services platform 104 can provide a signal back to the first unit (1002) based on the alert. For example, the first unit can be of the form of a mobile telephone that includes a camera. An application on the first unit associated with the service can be initiated and enable an operator user to initiate a check for a person or vehicle, such as by aiming the camera at a person or at the license plate or driver of a target vehicle. Information can be loaded into the mobile device associated with the person or vehicle. For example, a camera associated with the mobile telephone can be used to take a picture of the license plate of a vehicle or the face of a person. Similarly, data can be entered into a form presented by the application (e.g., where a driver's license number or license plate number can be entered). Other forms of data capture can be used, e.g., voice recognition and biometrics.

A location associated with the first unit is determined (1004). For example, the crime-fighting services platform 104 can determine a physical location of the first unit, such as a street address of a school.

In some implementations, determining the location can include accessing a record that includes the location information. For example, the crime-fighting services platform 104 can determine the location using information received from the first unit, e.g., using a serial number or other identifier to look up a corresponding address.

In some implementations, determining the location can include receiving the location information along with the prompt. For example, the school's address may be displayed when the prompt is received.

Responsive to the prompt, one or more second mobile units within a geographic area associated with the location are determined (1006). For example, the second units can include one or more of mobile patrol units 118, 120, 122, 124, 126 and 128 such as police cars, fire department vehicles, ambulances and/or other emergency vehicles. In some implementations, second units may not be located in car, but can be land-based units or can be included with or as a mobile application on a cell phone or other mobile device associated with a user. Determining the one or more second mobile units within a geographic area can be based on a distance of the second mobile units from the first unit, an expected response time, or other factors.

In some implementations, the prompt can include classification information, and eligible second units can be identified based at least in part on the classification information. For example, the prompt received at the crime-fighting services platform 104 can identify a fire-related event, and the second units that are determined can include fire trucks in the area. In some implementations, the classification information can classify a type of alert being raised by the user operator, e.g., whether the alert is associated with a fire or some other fire department-related emergency, a crime, a natural disaster, a weather-related event, or some other event.

A communication is output to the one or more second units (1008). For example, the communication can be an alert message that is broadcast to one or more second units in each of various emergency service units in the area, e.g., mobile patrol units 118, 120, 122, 124, 126 and 128 such as police cars, fire department vehicles, ambulances and/or other emergency vehicles.

In some implementations, outputting the communication can include outputting at least a portion (or all) of the prompt. As an example, the communication received in each of the squad cars can automatically include some or all of the message included in the original prompt, such as "we have an unidentified intruder . . . ".

A direct communication link is enabled between the user operator and an operator associated with a respective one of one or more second units (1010). For example, a screen available on the different units, including the mobile patrol units 118, 120, 122, 124, 126 and 128, can include an interface including text, images, audio and other forms of communication.

In some implementations, enabling a direct communication link can include opening a chat room for facilitating direct communications between the user operator and users associated with the one or more second units. For example, user interface screens associated with the crime-fighting services platform 104 can display a chat session by which users of the first unit and users of the one or more second units can carry on a conversations. Other forms of direct linking are possible. For example, a telephone link can be created between the two units. Other forms of direct communication including audio, text or video can be used.

Environment information is provided to the one or more second units based at least in part on the prompt (1012). For example, the second units (e.g., the mobile patrol units 118-128) can be provided with information associated with the first unit (e.g., the school).

In some implementations, the environment information can include a location of interest at a facility (e.g., a school office) associated with the first unit (e.g., the school). In some implementations, the environment information can include a layout of a facility associated with the first unit. For example, the environment information can be a map, schematic or other layout of the school and/or school office.

Information about the facility can include a map and/or image that includes the neighborhood around the school. Images can include, for example, aerial, street-level, or other types of images, schematics, renderings, blueprints or the like. In some implementations, video can also be included.

In some implementations, the location of interest can be provided as part of the prompt. In some implementations, the location of interest is provided initially with the alert information. In some implementations, the location of interest can be designated after receipt of layout information from the service. For example, when the prompt is provided to crime-fighting services platform 104, the platform can retrieve information associated with a facility at the location, and can provide a layout back to the user operator for display on the first unit. In turn, the user operator can indicate the area of interest (such as by touching a portion of the layout when presented on a touch screen device). Other means of designating the area of interest are possible. The environment information including the area of interest can be provided to an interface associated with the second mobile units (e.g., on the mobile patrol units 118-128). For example, in response to the receipt of the layout information, the user operator can identify the school gymnasium as the location of interest. The location of interest can be provided to one or more of the second mobile units as part of the environment information.

For example, when the prompt is provided to the crime-fighting services platform 104 (and received on the mobile patrol units 118-128), the prompt can include information that identifies a specific door to the office as the point of interest. The office door can be marked on the layout information, for example, to indicate an entrance that law enforcement or other emergency/first responder personnel are to use when responding to an emergency (e.g., a current situation at the school). In this example, the environment information can include the layout information with the point of interest information indicated or highlighted in some way on the layout.

In some implementations, instead of being provided the layout information, the layout information associated with a facility at the location can be retrieved by the second mobile units. For example, the first unit (e.g., the school) may not provide the school's layout, but the one or more second units can access layout information from other sources (e.g., data servers associated with the school, the school district, various municipalities, or other sources, including online sources).

In some implementations, the process 1000 can further include retrieving layout information associated with a facility at the location. For example, the crime-fighting services platform 104 can receive (and optionally store) information for several locations over time, e.g., in preparation for potentially needing the information if an event occurs at one of the locations.

Figure 11:
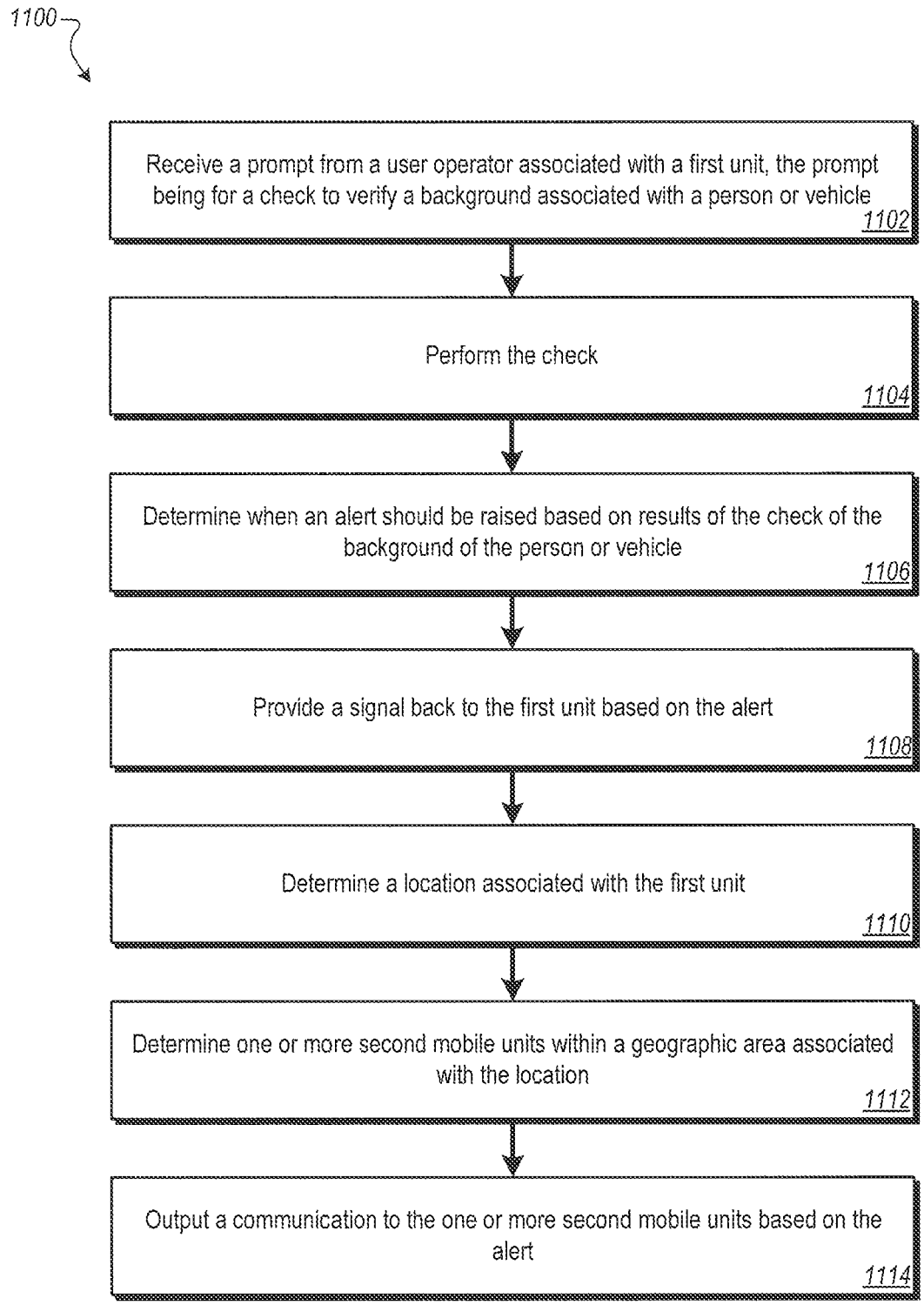
FIG. 11 is a flowchart of an example process for outputting a communication associated with an alert.

FIG. 11 is a flowchart of an example process 1100 for outputting a communication associated with an alert. In some implementations, the crime-fighting services platform 104 and/or other elements of the system 100 can perform steps of the process 1100 using instructions that are executed by one or more processors. FIGS. 1-9 are used to provide example structures for performing the steps of the process 1100.

A prompt is received from a user operator associated with a first unit (e.g., at a school), the prompt being for a check to verify a background associated with a person or vehicle (1102). For example, the prompt can be for a check to verify a background associated with a person or a vehicle. Determining when an alert should be raised can be based on a check of the background of the person or vehicle. A signal can be generated and provided back to the first unit based on the alert. For example, the first unit can be of the form of a mobile telephone that includes a camera. An application on the first unit associated with the service can be initiated and enable an operator user to initiate a check for a person or vehicle, such as by aiming the camera at the license plate or driver of a target vehicle. Information can be loaded into the mobile device associated with the person or vehicle. For example, a camera associated with the mobile telephone can be used to take a picture of the license plate of a vehicle or the face of a person. Similarly, data can be entered into a form presented by the application (e.g., driver's license number or license plate number). Other forms of data capture can be used, e.g., voice recognition and biometrics.

In some implementations, the first unit can be a mobile device. For example, one or more of the school staff can have a mobile phone or other mobile device on which an application is loaded that enables the mobile device to function as a first unit.

The check is performed (1104). For example, the crime-fighting services platform 104 can perform the background check using information available from (and/or background services provided by) agencies 106, 108, 110, 112, 114 and 116. Other sources of information may be accessed.

A determination is made as to when an alert should be raised based on results of the check of the background of the person or vehicle (1106). For example, depending on the information received on the background check, such as the person is a fugitive or has some other notable status, or the vehicle is stolen or known to be crime-related, a corresponding alert can be generated. The alert, for example, can be generated to automatically include pertinent information, including an identification (name, description, license plate number, etc.) of the person or vehicle.

A signal is provided back to the first unit based on the alert (1108). For example, the first unit can receive a signal that includes an indication of an alert and/or other information corresponding to the person or vehicle.

A location associated with the first unit is determined (1110). For example, an address and/or GPS location can be automatically determined for the first unit. The determination can be made, for example, by looking up an address associated with the first unit, by obtaining real-time GPS coordinates (e.g., if the first unit is mobile), by entry of a location by a user.

One or more second mobile units within a geographic area associated with the location are determined (1112). For example, the crime-fighting services platform 104 can determine one or more of the mobile patrol units 118-128 that are within a threshold distance or expected response time of the first unit.

A communication is output to the one or more second units based on the alert (1114). For example, each of the one or more mobile patrol units 118-128 within the geographic area can receive the alert.

In some implementations, a direct communication link can be enabled between the user operator and an operator associated with a respective one of one or more second units. For example, a chat session, audio feed, or other form of live, real-time communication can be established.

In some implementations, environment information associated with the location can be provided to the one or more second units based at least in part on the alert. For example, the environment information can include a location of interest (e.g., the school's office) at a facility associated with the first unit (e.g., the school at which the first unit exists). In some implementations, the environment information can include a layout of a facility associated with the first unit, e.g., a map of the school.

In some implementations, some of the information that is passed to the second units can originate at the first unit. For example, the location of interest can be provided as part of the alert.

In some implementations, the process 1100 can further include providing the user operator with layout information associated with the location and receiving from the user an indication of a point of interest based on the layout information wherein the environment information includes the point of interest. For example, the user operator can be presented with a layout of the school, and can identify on the layout a specific point of interest, such as a specific door by the school office by which emergency responders are to enter.

As will be appreciated by one skilled in the art, aspects of the illustrative embodiments may be embodied as a system, method or computer program product. Accordingly, aspects of the illustrative embodiments may take the form of an entirely hardware embodiment, an entirely software embodiment (including, but not limited to, firmware, resident software, or microcode) or an embodiment combining software and hardware aspects that may all generally be referred to herein as a "circuit," "module" or "system." Furthermore, aspects of the illustrative embodiments may take the form of a computer program product embodied in one or more computer readable medium(s) having computer readable program code embodied thereon.

Any combination of one or more computer readable medium(s) may be used in the illustrative embodiment. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), an optical fiber, a portable compact disc read-only memory ("CD-ROM"), an optical storage device, a magnetic storage devices or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium (including, but not limited to, wireless, wireline, optical fiber cane, RF, or any suitable combination of the foregoing).

Computer program code for carrying out operations for aspects of the illustrative embodiments may be written in any combination of one or more programming languages, including an object oriented programming language such as Microsoft .NET Framework, C#, Java, Smalltalk, C++ or the like and conventional procedural programming languages, such as the "C" programming language, Python programming language, or similar programming languages. The program code may execute entirely on the user's computer, partly on the user's computer, as a stand-alone software package, partly on the user's computer, and partly on a remote computer or entirely on the remote computer or server. The remote computer may be connected to the user's computer through any type of network, including a local area network ("LAN") or a wide area network ("WAN"), or the connection may be made to an external computer (e.g., through the Interact using an Internet Service Provider).

Aspects of the illustrative embodiments are described with reference to flowchart illustrations and/or block diagrams of methods, apparatus (systems) and computer program products according to the illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions (which execute via the processor of the computer or other programmable data processing apparatus) are processable to cause performance of the functions/acts specified in the flowchart and/or block diagram block or blocks.

These computer program instructions may also be stored in a computer readable medium that can direct a computer, other programmable data processing apparatus, or other devices to operate in a particular manner, such that the instructions stored in the computer readable medium produce an article of manufacture, including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process, such that the instructions that execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to the illustrative embodiments. In this regard, each block in the flowchart or block diagrams may represent a module, segment, or portion of code, which includes one or more executable instructions for implementing the specified logical operation(s). In some alternative implementations, the operations noted in the block may occur out of the order noted in the Figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by either general purpose or special purpose hardware-based systems that perform the specified operations or acts, or combinations of general or special purpose hardware and computer instructions.

The terminology used herein is for the purpose of describing particular embodiments only and is not intended to be limiting of the inventions. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the inventions in the form disclosed. Many modifications and variations will be apparent to those of ordinary skill in the art without departing from the scope and spirit of the inventions. The embodiment was chosen and described in order to best explain the principles of the inventions and the practical application, and to enable others of ordinary skill in the art to understand the inventions for various embodiments with various modifications as are suited to the particular use contemplated.

What is claimed is:

1. A method comprising:
   receiving a prompt from a user operator using a first unit;
   determining a location of the first unit, wherein the first unit is at a facility at the location, wherein the facility includes plural different areas each defining a different portion of the facility, and wherein the location is an address of the facility or GPS coordinates of the first unit;
   responsive to the prompt, identifying one or more second mobile units within a geographic area associated with the location;
   outputting a communication to the one or more second mobile units;
   enabling a direct communication link between the user operator and an operator associated with a respective one of the one or more second mobile units;
   receiving information specifying a location of interest from the user operator with the prompt or after receiving the prompt, wherein the location of interest is a specific one of the plural different areas of the facility and is not an area in which the user operator or the first unit is present at the time the user operator provides the information specifying the location of interest, and wherein the user operator specifies the location of interest with respect to a visual layout of the facility at the location; and
   providing environment information to the one or more second mobile units based at least in part on the prompt wherein the environment information includes a visual representation of the layout of the facility at the location including a visual representation of the user specified location of interest.

2. The method of claim 1 wherein the location of interest is a door of the facility.

3. The method of claim 2 wherein the environment information includes a layout of the facility.

4. The method of claim 2 wherein the location of interest is provided as part of the prompt.

5. The method of claim 1 further comprising providing the user operator with layout information associated with the location and receiving from the user an indication of the location of interest based on the layout information wherein the environment information includes the location of interest.

6. The method of claim 5 wherein the environment information includes the layout information with location of interest information.

7. The method of claim 5 further comprising retrieving layout information associated with the facility.

8. The method of claim 1 wherein the environment information includes a layout of the facility.

9. The method of claim 1 wherein the prompt includes classification information and wherein eligible second mobile units are identified based at least in part on the classification information.

10. The method of claim 9 wherein the classification information classifies a type of alert being raised by the user operator.

11. The method of claim 1 wherein determining the location includes accessing a record that includes information representing the location.

12. The method of claim 1 wherein determining the location includes receiving information specifying the location along with the prompt.

13. The method of claim 1 wherein outputting a communication includes outputting at least a portion of the prompt.

14. The method of claim 1 wherein the one or more second mobile units are associated with emergency service units.

15. The method of claim 1 wherein enabling a direct communication link includes opening a chat room for facilitating direct communications between the user operator and users associated with the one or more second mobile units.

16. The method of claim 1 wherein the first unit is a mobile device.

17. The method of claim 1 wherein the first unit is a mobile telephone, tablet or laptop computer.

18. The method of claim 1 further comprising providing an application on a mobile device for enabling the user operator to initiate the prompt.

19. The method of claim 1 wherein the prompt is for a check to verify a background associated with a person or a vehicle, determining when an alert should be raised based on a check of the background of the person or vehicle, and providing a signal back to the first unit based on the alert.

20. A method comprising:
    receiving a prompt from a user operator associated with a first unit, the prompt being for a check to verify a background associated with a person or vehicle;
    performing the check;
    determining when an alert should be raised based on results of the check of the background of the person or vehicle;
    providing a signal back to the first unit based on the alert;
    determining a location of the first unit, wherein the first unit is at a facility being at the location, wherein the facility includes plural different areas each defining a different portion of the facility, and wherein the location is an address of the facility or GPS coordinates of the first unit;
    identifying one or more second mobile units within a geographic area associated with the location;
    receiving information specifying a location of interest from the user operator with the prompt or after receiving the prompt, wherein the location of interest is a specific one of the plural different areas of the facility and is not an area in which the user operator or the first unit is present at the time the user operator provides the information specifying the location of interest, and wherein the user operator specifies the location of interest with respect to a visual layout of the facility at the location; and
    outputting a communication to the one or more second mobile units based on the alert including providing environment information to the one or more second mobile units based at least in part on the prompt wherein the environment information includes a visual representation of the layout of the facility at the location including a visual representation of the user specified location of interest.

21. The method of claim 20 further comprising enabling a direct communication link between the user operator and an operator associated with a respective one of one or more second mobile units.

22. The method of claim 20 further comprising providing environment information to the one or more second mobile units based at least in part on the prompt.

23. The method of claim 22 wherein the location of interest is specified by the user operator.

24. The method of claim 23 wherein the environment information includes a layout of the facility.

25. The method of claim 23 wherein the location of interest is provided as part of the prompt.

26. The method of claim 22 further comprising providing the user operator with layout information associated with the location and receiving from the user an indication of the location of interest based on the layout information wherein the environment information includes the location of interest.

27. The method of claim 20 wherein the first unit is a mobile device.

\* \* \* \* \*